(12) United States Patent
Giorcelli et al.

(10) Patent No.: US 11,469,981 B2
(45) Date of Patent: Oct. 11, 2022

(54) NETWORK METRIC DISCOVERY

(71) Applicant: Cisco Technology, Inc., San Jose, CA (US)

(72) Inventors: Stefano Giorcelli, Valbonne (FR); Joshua Anderson, Parkville, MO (US)

(73) Assignee: Cisco Technology, Inc., San Jose, CA (US)

( * ) Notice: Subject to any disclaimer, the term of this patent is extended or adjusted under 35 U.S.C. 154(b) by 25 days.

(21) Appl. No.: 16/746,780

(22) Filed: Jan. 17, 2020

(65) Prior Publication Data
US 2021/0226870 A1 Jul. 22, 2021

(51) Int. Cl.
*H04L 43/0817* (2022.01)
*H04L 43/0829* (2022.01)
*H04L 41/0631* (2022.01)
*H04L 41/22* (2022.01)
*H04L 61/4511* (2022.01)
*H04L 101/622* (2022.01)

(52) U.S. Cl.
CPC ...... *H04L 43/0817* (2013.01); *H04L 41/0631* (2013.01); *H04L 41/22* (2013.01); *H04L 43/0829* (2013.01); *H04L 61/4511* (2022.05); *H04L 2101/622* (2022.05)

(58) Field of Classification Search
None
See application file for complete search history.

(56) References Cited

U.S. PATENT DOCUMENTS

| | | | | |
|---|---|---|---|---|
| 2004/0143678 A1* | 7/2004 | Chari | ................ | H04W 40/02 709/240 |
| 2005/0262241 A1* | 11/2005 | Gubbi | ................ | H04W 12/108 709/225 |
| 2014/0362719 A1* | 12/2014 | May | ................ | H04L 43/0829 370/252 |
| 2016/0165651 A1* | 6/2016 | Pathuri | ................ | H04W 76/11 370/329 |
| 2019/0028560 A1* | 1/2019 | Holland | ................ | G06F 11/3419 |

* cited by examiner

*Primary Examiner* — Schquita D Goodwin
*Assistant Examiner* — Ishrat Rashid
(74) *Attorney, Agent, or Firm* — Lee & Hayes, P.C.

(57) ABSTRACT

This disclosure describes techniques for discovering network metrics relating to communications between a client device and a server device via a network. The client device may send one or more queries to a network device of the network. The network device may reply to the query of the client device with network metrics. The client device may forward the network metrics to the server device. For instance, an administrator at the server device may receive the network metrics. As such, the network metrics are discoverable by the client device and/or the administrator. Furthermore, the administrator may be able to use the discovered network metrics to monitor and/or troubleshoot a performance issue.

20 Claims, 8 Drawing Sheets

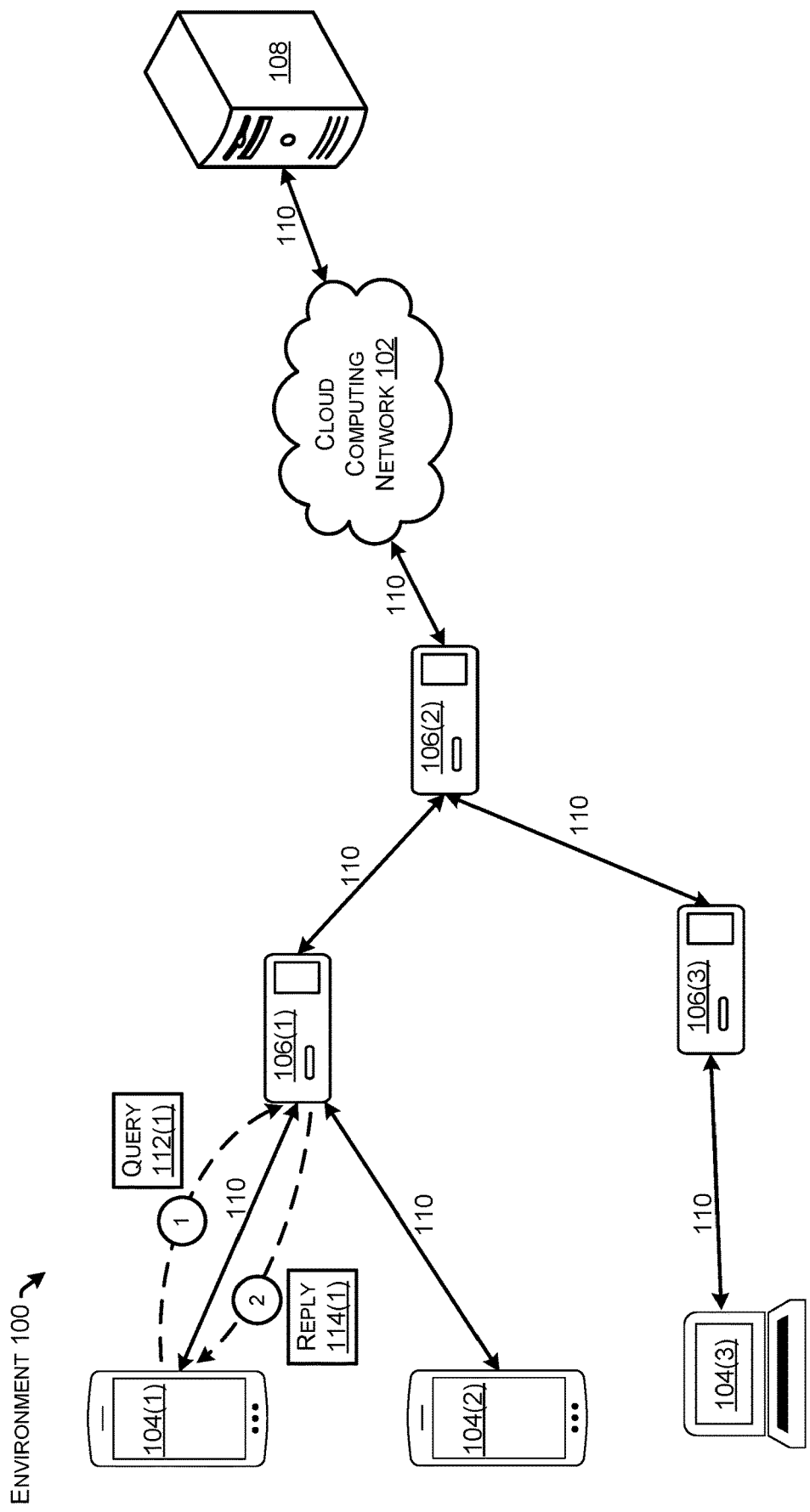

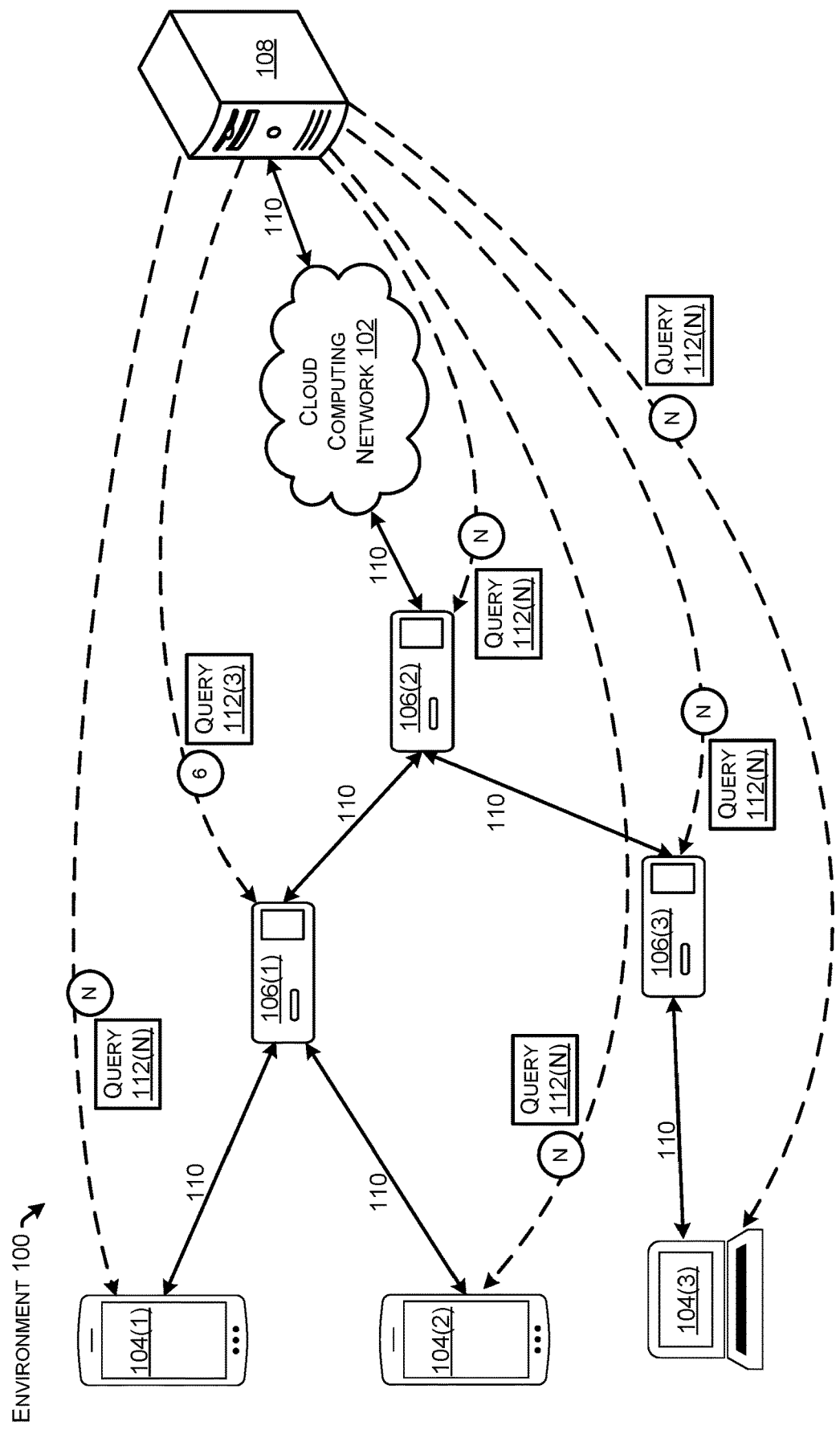

NETWORK METRIC DISCOVERY

TECHNICAL FIELD

The present disclosure relates generally to discovering network metrics relating to a connection of a client device with a network, thereby enabling performance improvements for an application delivered over the network.

BACKGROUND

A hardware or software client running a cloud application may experience a performance issue related to a network through which the client connects to the cloud. For instance, the client may experience an issue relating to registration status with the network, or an issue related to traffic statistics (e.g., dropped packets). The client may report the performance issue to the cloud application. However, an administrator of the cloud application may have difficulty diagnosing the issue without some understanding of network metrics specific to the client. For example, if the administrator sees that a cloud-registered client is currently not registered to the cloud, the administrator may wish to check whether the network site at which the client was last registered is experiencing connectivity issues. In another example, if an administrator sees a report for poor quality for a real-time media session involving a client, the administrator may wish to check for issues involving the network to which the client was connected at the time of the report. Some hardware devices may be able to derive information and/or collect network metrics about the network and/or a network device through which they are connected to the cloud via discovery protocols, such as layer-2 discovery protocols (e.g., link layer discovery protocol (LLDP)). In contrast, software clients (and some hardware clients) generally do not have access to discovery protocols. For instance, software clients running a cloud application may be running on a general-purpose device (e.g., personal computer, mobile device). The cloud application may be delivered "over the top" to the general-purpose device, such that neither the software client nor the cloud application has knowledge of the underlying network. Therefore, some clients may be unable to collect relevant network metrics, and unable to report such information to the cloud application. A method for discovering network metrics could significantly improve success and/or speed at diagnosing and triaging network performance issues, improving overall network performance and productivity, particularly for cloud applications.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

FIGS. 1A-1D illustrate component diagrams with an example environment in which network metric discovery scenarios may be performed, in accordance with the present concepts.

DESCRIPTION OF EXAMPLE EMBODIMENTS

Overview

Figure 1B:
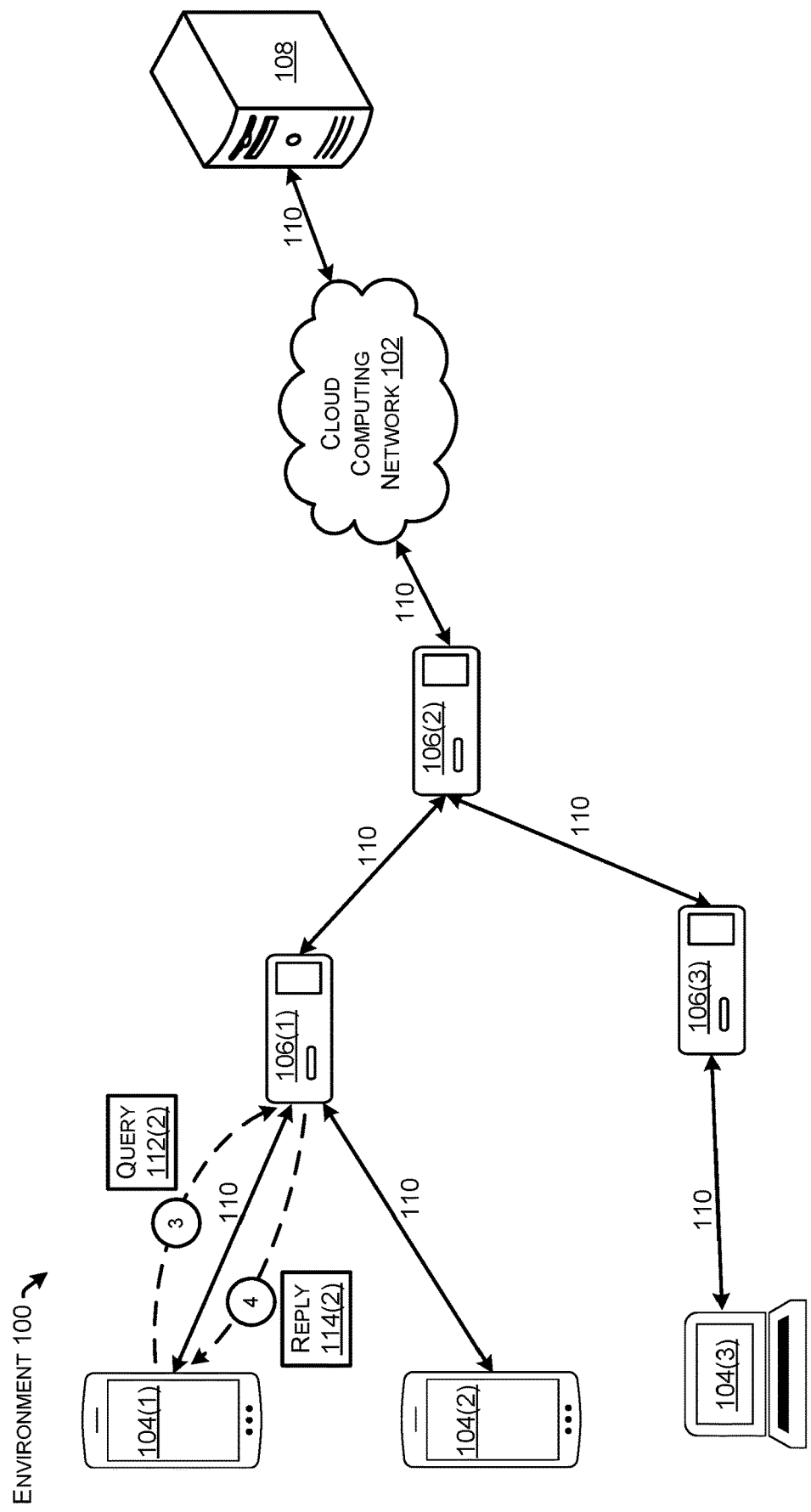

This disclosure describes, in part, a method that may be implemented at least in part by a client device communicatively coupled to a network. The method may include establishing a network connection between the client device and the network. The method may send one or more queries from the client device to the network, the one or more queries requesting information regarding a network device of the network. In response to sending the one or more queries, the method may include receiving, at the client device and from the network device, an address of the network device and connectivity details of the network device. Also, the method may include sending the address of the network device and the connectivity details of the network device from the client device to the network.

This disclosure also describes, in part, a system that may include one or more processors and one or more non-transitory computer-readable media storing computer-executable instructions that, when executed by the one or more processors, may cause the one or more processors to receive, from a client device communicatively coupled to the system via a network connection with a network device, an address of the network device. The computer-executable instructions may also cause the one or more processors to receive, from the client device, connectivity details of the network device and an indication of a packet loss associated with the network connection. Based at least in part on the connectivity details of the network device, the computer-executable instructions may further cause the one or more processors to determine a potential cause of the packet loss, generate a report of the potential cause of the packet loss, and/or send the report to a display device for presentation to a user.

This disclosure also describes, in part, another method that may include establishing a network connection between a client device and a network. The method may include sending a first query from the client device to the network, the first query corresponding to a request for an address of the network device. In response to sending the first query, the method may include receiving, at the client device and from the network device, the address of the network device. In response to receiving the address of the network device, the method may include sending, from the client device and to the network device, a second query corresponding to connectivity details of the network device. Further, in response to sending the second query, the method may include receiving, at the client device and from the network device, the connectivity details of the network device. The method may also include sending the address of the network device and the connectivity details of the network device from the client device to the network.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques for discovering one or more network metrics relating to a connection of a client device with a server device. The client device and server device may be connected via one or more networks (e.g., a wired network, a wireless network, a cloud computing network). The client device may send a query via the one or more networks, which may be intercepted by a network device. The network device may reply to the query of the client device with an address of the network device. The client device may communicate with the network device to collect other network metrics. The client device may forward the address of the network device and/or other network metrics to a server device (e.g., a device accessed via a cloud computing network). For instance, an administrator of an application may receive the network metrics at the server device. As such, the network metrics are discoverable by the client device and/or by the administrator of the application. Furthermore, the administrator may be able to use the discovered network metrics to diagnose, report, and/or triage a network or application performance issue.

In some examples, the client device may run a cloud application over the network. The "client" may be a software client that is running on the client device, for instance. The client device may be a general-purpose device (e.g., personal computer, mobile device) or may be an application-specific device, such as a device from a specific manufacturer. The network may connect the client device to computing resources in the cloud (as used herein, "cloud" may refer to network-connected server devices and/or other computing resources that are generally not local to the client device). The network metrics may relate to one or more network devices that are part of the network and/or to one or more network connections within the network. For example, the network metrics may be viewed as providing topology visibility, such as network path information. In another example the network metrics may relate to a status or type of connections between devices of the network. Network metrics may simply include an address, name, and/or other identifying information for at least one network device connecting the client device to the cloud, and/or an identification of a particular network to which the client device is connected. The address of the network device may be an internet protocol (IP) address, for instance. Additionally, or alternatively, network metrics may include a variety of other information related to the network, such as information related to registration of the cloud application with the network, data traffic statistics, timestamps, connectivity information, network topology information, addresses and/or names of various other intermediary devices, etc. Network metrics may include registration information, such as an identifier (e.g., unique identifier) of the client and/or network device.

In order to initiate discovery of network metrics, the client device may send a query to a device via the network. The query may be a request for information about one or more devices of the network with which the client device is connected to the cloud. An example query is a Domain Name System (DNS) query (e.g., DNS request). The query may be intercepted by a network device of the network, rather than passing through to a cloud destination (e.g., server device, backhand service), for instance. In some examples, the query may be intercepted by a network device located along a network path between the client device and the cloud. The network device may be adjacent to the client device or may be separated from the client device by other intermediary devices. Similarly, the network device may be adjacent to the cloud or may be separated from the cloud by other intermediary devices. The network device may be wired to or connected wirelessly to the client device, the cloud, and/or other intermediary devices.

Upon interception of the query, the network device may reply to the client device. For example, the query may be a request for an address, and the network device may reply to the client device with its own address. In this manner, the client device may discover the address of the network device through which the client device is connected to the cloud. The client device may send additional queries or commands to the network device to collect further network metrics. For instance, once the client device has learned the address of the network device, the client device may send a subsequent query to learn more information about the network device and/or network connections relevant to the cloud application.

In some examples, the client device may forward the network metrics on to the cloud. The network metrics may be forwarded to the cloud in conjunction with or independent from other functionality. For instance, the network metrics may be reported to the cloud along with other reporting or communication associated with the cloud application, such as quality assurance metrics related to the software client. As such, an administrator (or other entity) in the cloud may receive network metrics associated with the client device. The administrator may also receive quality assurance metrics of the software client. The administrator may use any or all of this reported information to troubleshoot issues. In some cases, the administrator may be able to efficiently determine where network performance has impacted application performance. For instance, an administrator may receive a report of diminished application performance, and see that a cloud-registered client is currently not registered to the cloud. With the network metrics, the administrator may be able to check whether the network site at which the client was last registered is experiencing connectivity issues. In another instance, if an administrator sees a report for poor quality for a real-time media session involving a client, the administrator may able to use the network metrics to check for issues involving the network to which the client is connected.

Furthermore, the administrator may be able to use the network metrics to assist other client devices. For instance, with the address of the network device, the administrator may be able to communicate with the network device to gather additional information. The administrator may be able to learn of additional client devices that are connected through the network device. The administrator may be able to investigate whether any additional client devices are experiencing performance issues. The administrator may also be able to determine whether the performance issues of the additional client devices are related to the network device, and/or whether the original client device and the additional client devices are experiencing similar issues related to the network. In this manner, network metric discovery may provide a proactive technique for an administrator to investigate performance issues of a cloud application.

To summarize, network metric discovery provides a technique for a software client to derive information and/or collect network metrics about the network and/or a network device through which the client device may be connected to the cloud. Network metrics associated with the underlying network may be provided to an administrator of the cloud application. With the discovered network metrics, the administrator may be able to troubleshoot and/or potentially fix a performance issue experienced by the client device. More broadly, the administrator may be able to use the discovered network metrics to proactively investigate and/or assist other client devices. As such, network metric discovery may improve performance across many client, network, and/or server devices in support of a cloud application. Network metric discovery may be leveraged by any application for which network connectivity and/or performance are important.

Although the examples described herein may refer to client device running software associated with a cloud application, the techniques can generally be applied to any device using a network for connectivity. Further, the techniques are generally applicable for any network of devices managed by any entity where virtual resources are provisioned. In some instances, the techniques may be performed by software-defined networking (SDN), and in other examples, various devices may be used in a system to perform the techniques described herein. The devices by which the techniques are performed herein are a matter of implementation, and the techniques described are not limited to any specific architecture or implementation.

The techniques described herein provide various improvements and efficiencies with respect to network communications. For instance, the techniques described herein may reduce the amount of computational resource use, storage, dropped data, latency, and other issues experienced in networks due to lack of network resources, overuse of network resources, issues with timing of network communications, and/or improper routing of data. By improving network communications across a network, overall performance by servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIGS. 1A-1D collectively illustrate an example environment 100 in accordance with the present network metric discovery concepts. Example environment 100 includes cloud computing network 102 (e.g., network) and one or more client devices 104, network devices 106 (e.g., router, switch, access point), and server devices 108. In some cases, parentheticals are utilized after a reference number to distinguish like elements. Use of the reference number without the associated parenthetical is generic to the element. In FIGS. 1A-1D, three client devices 104 (104(1), 104(2), and 104(3)), three network devices 106 (106(1), 106(2), and 106(3)), and one server device 108 are shown. The number of each of the device types is simply for illustration purposes and is not meant to be limiting.

Within the example environment 100, the client devices 104, network devices 106, server devices 108, and/or other devices may exchange communications (e.g., packets) via one or more network connections 110, indicated by double arrows, and/or via the cloud computing network 102. Various types of communicative couplings are envisioned for the network connections 110. In some examples, the network connections 110 may be wired or wireless. The network connections 110 may be transport control protocol (TCP) network connections, information-centric networking (ICN), and/or any network connection that enables the client devices 104, network devices 106, and/or server devices 108 to exchange packets with other devices. The network connections 110 may be viewed as data paths between the client devices 104, network devices 106, server devices 108, and/or with or through the cloud computing network 102. It should be appreciated that the term "network connection" may also be referred to as a "network path."

As noted above, client devices 104 may be any type of user device, including general-purpose devices. As depicted in FIGS. 1A-1D, client device 104(1) and client device 104(2) are manifest as mobile devices, while client device 104(3) is manifest as a personal computer. One or more of client devices 104 may run software associated with a cloud application. Network devices 106 may be any type of networking device, including switches, routers, access points, etc. One or more of network devices 106 may assist in connecting the client devices 104 to the cloud, such as for purposes of running the cloud application. As such, performance of the cloud application may rely on network connectivity among the devices shown in FIGS. 1A-1D, about which network metrics may be discovered. The example illustrated in FIGS. 1A-1D may be viewed as a scenario in which client device 104(1) is running a real-time media session with the cloud. For instance, the real-time media session may be an online video-conferencing application (e.g., Cisco Webex™). The depiction of a real-time media session in this example is not meant to be limiting, other applications are contemplated in accordance with network metric discovery concepts.

FIGS. 1A-1D show several examples of communications associated with network metric discovery among client devices 104, network devices 106, and server device 108. The example communications are indicated with dashed, numbered lines. For example, referring to FIG. 1A, at "Step 1," client device 104(1) may send a query 112(1) to network device 106(1). Query 112(1) may be a request for at least one network metric from network device 106(1). In some examples, query 112(1) may be a request (e.g., DNS request) for an address (e.g., IP address) of network device 106(1). Step 1 may be viewed as "switch discovery" in some cases, intended to discover information about network device 106(1) (e.g., a switch).

Various triggers are contemplated for the initiation of Step 1. In some examples, client device 104(1) may send query 112(1) in association with client device 104(1) booting up, waking up, and/or a cloud application being started up on client device 104(1). Client device 104(1) may send query 112(1) in an instance where client device 104(1) connects or reconnects to the network. In the scenario involving a real-time media session, client device 104(1) may send query 112(1) in accordance with Session Initiation Protocol (SIP) signaling. In some cases, client device 104(1) may send query 112(1) in response to receiving a request from an administrator (e.g., server device 108) to send query 112(1), to provide network metrics, and/or to otherwise initiate Step 1. Additionally or alternatively, query 112(1) may be sent periodically, such as at a regular time interval. The time interval may be preprogrammed and/or may be variable. The time interval may be designated by the cloud application, for instance. In some cases, software running on client device 104(1) and associated with a cloud application may include a feature that instructs client device 104(1) to initiate Step 1. The instructions may direct client device 104(1) to resolve a domain, for instance. As such, query 112(1) may include a domain name, which may be a trigger for a network device 106 to intercept query 112(1) and formulate a reply to client device 104(1). Step 1 may be viewed as pointing a web browser from the client device 104(1) to the network in order to discover and display a status of the first network device 106 along the path that recognizes the query 112(1). The discovery of the network device 106 may enable at least some amount of topology visibility.

At "Step 2," network device 106(1) may send a reply 114(1) to client device 104(1). Reply 114(1) may include at least one relevant network metric, such as an address of network device 106(1). In general, any network device 106 along a network path from client device 104(1) to the cloud computing network 102 that is capable of intercepting query 112(1) may do so. In some cases, the first network device 106 along the network path that has the capability may intercept query 112(1). As shown in the example scenario in FIGS. 1A-1D, network device 106(1) intercepts query 112 (1) and generates reply 114(1). In a different instance, network device 106(1) may not be able to intercept a different query from client device 104(1), and network device 106(2) may be the first network device 106 along the network path that is able to intercept the different query and generate a corresponding reply. Referring again to the scenario in FIGS. 1A-1D, one example domain that may be included by client device 104(1) with query 112(1) is "mynetwork.local." In this instance, network device 106(1) may be capable of intercepting query 112(1) and generating reply 114(1) with the IP address of network device 106(1). In some examples, Step 2 may be viewed as DNS interception of a well-known and/or predetermined domain name irrespective of any particular device manufacturer. Also, a query 112 does not need to be an actual domain name. Any of a variety of domain names or other codes are contemplated for inclusion in query 112(1) and/or triggering a network device 106 to generate a reply 114(1) with at least one network metric.

Note that in general, a query may be sent by any client device 104 in environment 100 for the purpose of discovering at least one network metric (such as an IP address of a network device). For instance, client device 104(3) may send an initial query, similar to query 112(1). However, in some cases, a query sent by a client device 104 may not be intercepted by a network device 106 capable of replying to the query. For instance, client device 104(3) may send a query to the network, but neither network device 106(3) nor network device 106(2) may be capable of replying. In this instance, in return for an initial query that includes a domain ".local," client device 104(3) may receive an error response, such as "domain does not exist" from a DNS server. In other examples, if a domain used in an initial query exists, but no local network device is capable of replying, the client device 104(3) may receive a valid IP address of some server with that domain, but a subsequent request (e.g., query 112(2), explained below) may return an error response code, such as an HTTP 404 "Page Not Found" error message.

"Step 3" and "Step 4" of the network metric discovery scenario will now be described with reference to FIG. 1B. At "Step 3," the client device 104(1) may send another query 112(2) to the network device 106(1). Query 112(2) may be a request for at least one network metric from network device 106(1). In some cases, network device 106(1) may use an Application Programming Interface (API) to reply to client device 104(1) and/or otherwise establish communication. Query 112(2) may include a domain name, and potentially a sub-directory for the network metric API, such as "mynetwork.local/discover/." Various network metrics may be requested via query 112(2), such as a name of the network device 106(1), a media access control (MAC) address of the network device 106(1), an identifier associated with a customer site (e.g., network ID), a connectivity type (e.g., wired or wireless), information relating to a physical location of devices or a physical distance between devices, information relating to a number of hops between devices, and/or other connectivity details (e.g., a switch port ID for wired connections, a service set identifier (SSID) for wireless connections). In some cases, query 112(2) may be an HTTP GET command, which may be directed to "mynetwork.local/discover/."

At "Step 4," network device 106(1) may send reply 114(2) to client device 104(1). Reply 114(2) may include at least one relevant network metric. The reply may include any network metrics, including any network metric requested by client device 104(1) and/or any other network metrics that may not have been specifically requested. As suggested above, network device 106(1) may use an API to reply to client device 104(1) and/or otherwise establish communication. The API may be a web-based API, such as a Hypertext Transfer Protocol (HTTP) API. The API may return data in any reasonable format, such as JavaScript Object Notation (JSON), Extensible Markup Language (XML), or some other format.

In some implementations, an order of Steps 1-4 may be arranged differently, or some of Steps 1-4 may be omitted. For example, network metric discovery may include discovering an address of a network device 106 in Steps 1 and 2, then proceeding on to Step 5, without or before collecting additional network metrics. Alternatively, network metric discovery may include discovering some other network metric than an address, in an exchange between a client device 104 and a network device 106, then proceeding to Step 5. In another example, a client device 104 may have learned an address of a network device 106 by an alternative method, and network metric discovery may begin with Steps 3 and 4, followed by Step 5. Network metric discovery may also include performing Steps 1 and 3 concurrently, such as with grouped queries being sent into the network. Regardless, network metric discovery includes learning at least one network metric about a network device 106 and/or a network connection 110.

Where the client device 104(1) is not connected to a network device 106 capable of replying to query 112(2), the client device 104(3) may receive an error response code, such as an HTTP 404 "Page Not Found" error message. For instance, the network topology may have changed between Step 2 and Step 3, such that the client device 104(1) is no longer connected to the cloud computing network 102 via the network device 106(1). However, knowledge that client device 104(1) is not connected to the cloud computing network 102 via network device 106 capable of replying to query 112(1) and/or query 112(2), and/or knowledge of a changed or broken connection, may also be useful to an administrator for troubleshooting purposes. Therefore any error message or lack of response may also be worth reporting to the cloud application, such as in Step 5.

Figure 1C:
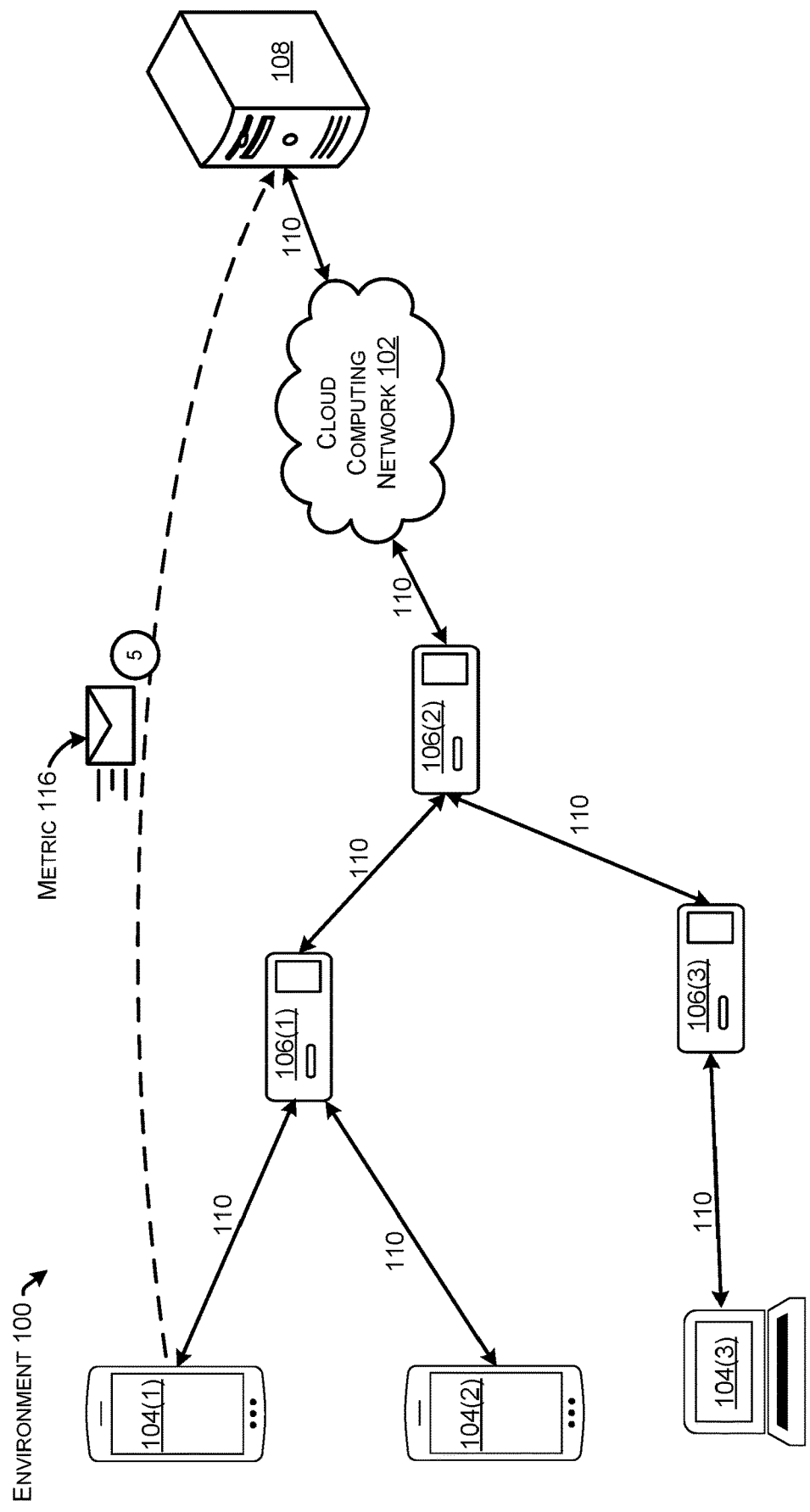

At "Step 5," illustrated in FIG. 1C, at least one metric 116 may be sent from client device 104(1) to server device 108. The metric 116 may be sent along the network path, through network device 106(1) and network device 106(3), through the cloud computing network 102, to server device 108. The metric 116 may include one or more network metrics relevant to the cloud application. The one or more network metrics may include information learned during the network metric discovery process in Steps 1, 2, 3, and/or 4. The metric 116 may be sent by client device 104(1) in conjunction with other functionality of the cloud application. Metric 116 may be combined with delivery of routine reporting or other communications in the course of running the cloud application on client device 104(1). In some examples, client device 104(1) may include the metric 116 in an SIP REGISTER message sent to the server side of the cloud application. Additionally, Step 5 may be repeated. For instance, client device 104(1) may include additional metrics 116 in multiple messages sent to the server side of the cloud application. For instance, client device 104(1) may send another metric 116 at the end of a real-time media session, such as with a SIP BYE message. Server device 108 may save and/or store network metrics received as metric 116. In some examples, network metrics may be stored in call records associated with a real-time media session.

For the purposes of the scenario illustrated in FIGS. 1A-1D, server device 108 will be considered as providing administrative functionality for the cloud application, such as interfacing with a user through a cloud management portal. Note that in other cases, administration, management, and/or interfacing functionality may be distributed among multiple server devices 108. The server device 108 and/or administrator may be able to use metric 116 and/or access the information from metric 116 in storage. With the information from metric 116, the server device 108 and/or administrator may be able to monitor, prevent, diagnose, troubleshoot, report, display, triage, and/or fix performance issues for the cloud application, for instance. Server device 108 may be able to display richer information associated with clients of the cloud application to a user (e.g., administrator, manager). For example, server device 108 may be able to a display device status for client device 104(1), including information related to the network connection of client device 104(1) through network device 106(1). The device status may include registered/unregistered status, a last updated network device name, connectivity type, and/or connectivity details. Server device 108 may be able to show a quality of the experience that may have been provided to the client at the client device 104(1). For instance, server device 108 may be able to display information related to whether the client experienced packet loss, delay, jitter, etc.

In some implementations a cloud management portal may be designed to display information received via metric(s) 116. Such a portal may provide enhanced functionality and/or display capabilities for network and/or cloud application performance. For instance, a customer at a client device 104 may enable integration with a portal. In this instance, a customer may export an API key to enable launching of a cloud management portal for a particular site (e.g., Cisco Meraki portal). In some examples, an administrator may utilize the cloud management portal to correlate cloud application issues with network issues. For instance, the administrator may utilize the cloud management portal to correlate device registration issues with a network connectivity problem. The cloud management portal may be accessible for a relevant network during a real-time media session. In some cases, a cloud management portal may be viewed as an analytics portal to monitor network and/or cloud application performance.

In some implementations, Step 5 may be viewed as the conclusion of network metric discovery. Stated another way, network metric discovery may include discovering at least one network metric, and providing the at least one network metric to a cloud application. An administrator may then use the at least one network metric to monitor and/or improve performance of the cloud application. However, in some cases, network metric discovery may include further steps to collect further network metrics, and/or to broaden usefulness of the learned information to other client devices 104 and/or network devices 106. FIG. 1D illustrates example further steps for network metric discovery.

At "Step 6," illustrated in FIG. 1D, server device 108 may send query 112(3) to network device 106(1). Query 112(3) may be a request for at least one network metric from network device 106(1). Once server device 108 has an address for network device 106(1), server device 108 may communicate with network device 106(1), such as to request network metrics or other information. Server device 108 may have received the address of network device 106(1) with the metric 116 in Step 5, for instance, and therefore be able to communicate directly with network device 106(1). In this manner, server device 106(1) and/or an administrator of the cloud application may be able to collect "backhand" information about the network device 106(1) from the server side.

Furthermore, at "Step N," server device 108 may send any number "N" of additional queries 112(N) in any number "N" of additional steps to various other client devices 104 and/or network devices 106. Queries 112(N) may be requests for at least one network metric from client devices 104 and/or network devices 106. The queries 112(N) may be related to information received in metric 116, such as follow-up questions to begin troubleshooting a performance issue. The queries 112(N) may be designed to further illuminate a network topology for the cloud application. In some examples, seeing an issue with client device 104(1), the administrator may be able to proactively contact other client devices 104, even before the other client devices have detected and/or reported a performance problem. With the original metric 116 received in Step 5 and/or with additional network metrics collected in response to query 112(3) and/or queries 112 (N), the administrator may be able to manage the cloud application in a way that contains, stops, and/or mitigates the spread of performance issue across various devices.

Note that even a single network metric, such as a MAC address, IP address, or other identity information of network device 106(1) may be useful to an administrator of a cloud application, since the single network metric may provide the administrator with a starting point for troubleshooting a performance issue. For example, in a scenario where client device 104(1) reports to server device 108 that client device 104(1) is having trouble connecting through network device 106(1), the administrator may be able to use an address of network device 106(1) to troubleshoot the problem. The administrator may be able to determine at least one other client device 104 that is connected to the network via network device 106(1), such as client device 104(2). The administrator may then be able to send a query 112(N) to client device 104(2), requesting information about its connectivity status via network device 106(1). Client device 104(2) may report back to the administrator that it is not experiencing a connectivity issue, in which case the administrator might suspect a problem local to client device 104(1). In another instance, client device 104(2) may report back to the administrator that it is also experiencing a connectivity issue, in which case the administrator might suspect a problem with network device 106(1).

To summarize, the network metric discovery techniques described herein may be used to improve performance of an application over a network. Network metric discovery may be used to learn information about a network that may otherwise be undetectable or invisible to an administrator and/or a client device. The techniques may be relatively lightweight, featuring low computational cost and/or low bandwidth usage. Network metric discovery enables an administrator to correlate application analytics data with network analytics data, and therefore help troubleshoot or even proactively prevent performance degradation.

Figure 2:
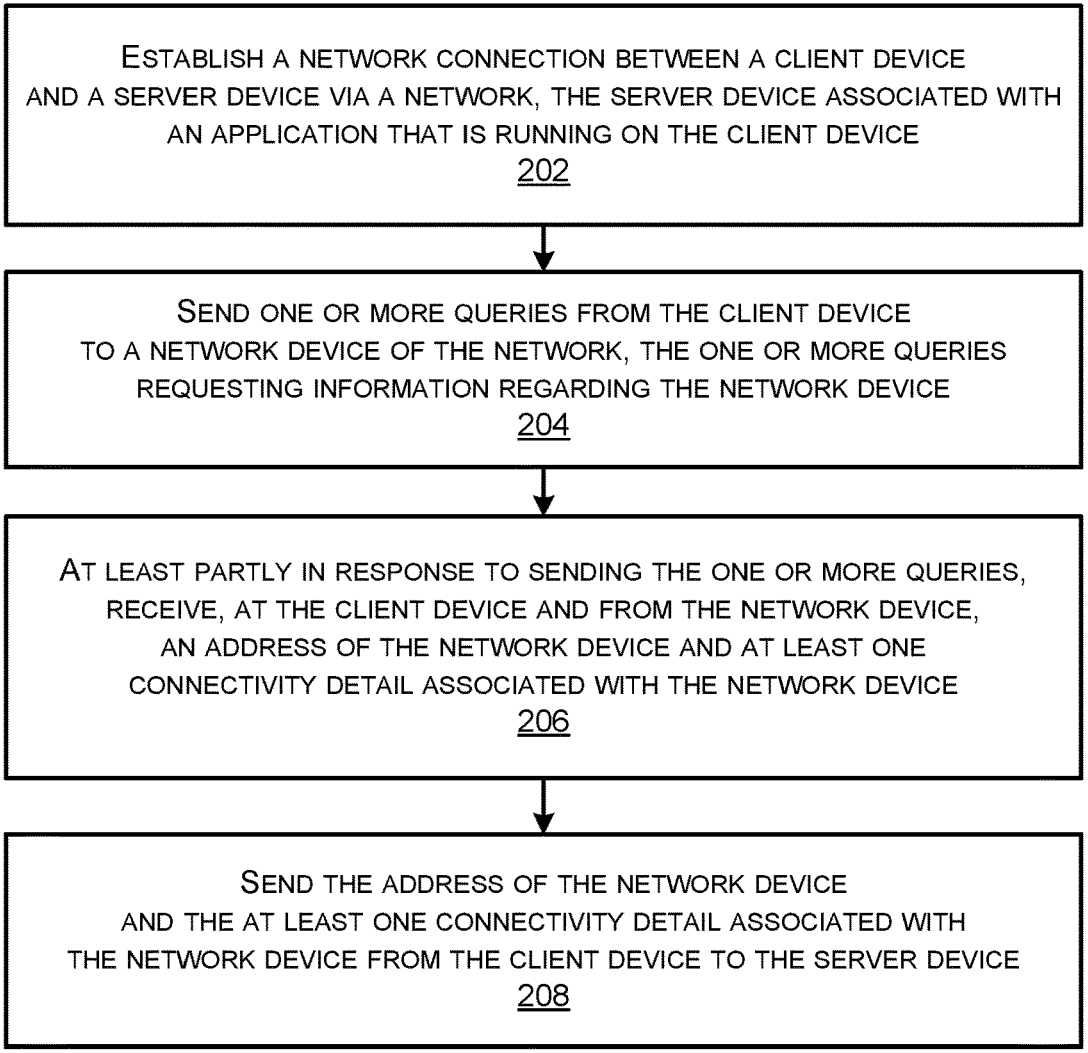
FIGS. 2 and 3 illustrate flow diagrams of example methods for the discovery of network metrics, in accordance with the present concepts.
Figure 3:
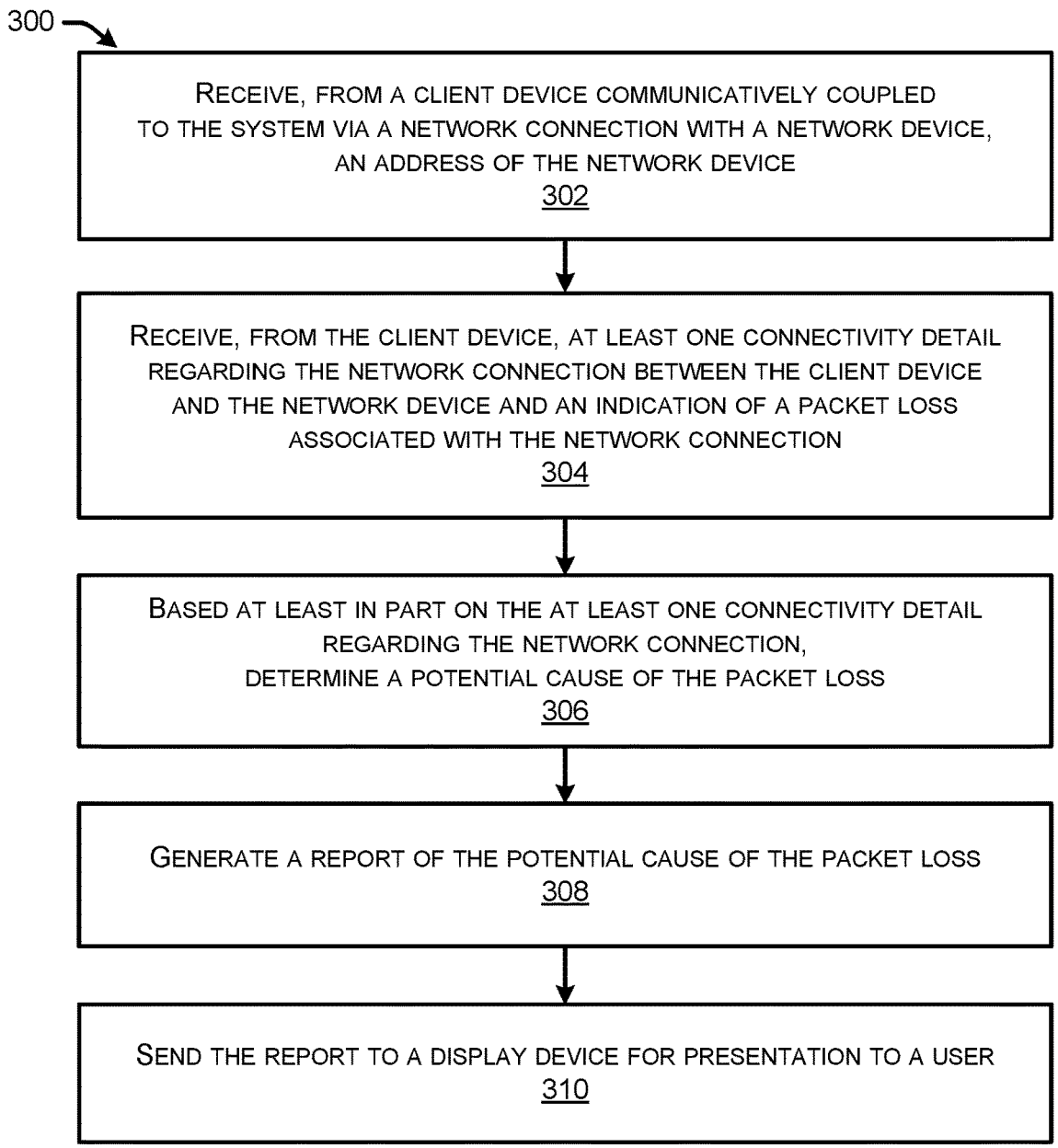

FIGS. 2 and 3 illustrate flow diagrams of example methods 200 and 300 that include functions that may be performed at least partly by a device, such as client devices 104, network devices 106, or server devices 108 described relative to FIGS. 1A-1D. The logical operations described herein with respect to FIGS. 2 and 3 may be implemented (1) as a sequence of computer-implemented acts or program modules running on a computing system and/or (2) as interconnected machine logic circuits or circuit modules within the computing system.

The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 2 and 3 and described herein. These operations may also be performed in parallel, or in a different order than those described herein. Some or all of these operations may also be performed by components other than those specifically identified. Although the techniques described in this disclosure is with reference to specific devices, in other examples, the techniques may be implemented by less devices, more devices, different devices, or any configuration of devices and/or components.

FIG. 2 illustrates a flow diagram of an example method 200 for a client device to perform network metric discovery techniques. Method 200 may be performed by a client device (e.g., client device 104) communicatively coupled to a network device (e.g., network device 106) via a network (e.g., network connection 110), for instance. In some examples, method 200 may be performed by a computing device comprising one or more processors and one or more non-transitory computer-readable media storing computer-executable instructions that, when executed by the one or more processors, cause the one or more processors to perform method 200.

At 202, method 200 may include establishing a network connection between a client device and a server device via a network. The server device may be associated with an application that is running on the client device, for instance. In some examples, the client device may be a smart phone, mobile phone, personal computer, or other mobile or personal computing device. Method 200 may include establishing the network connection between the client device and the network for the purposes of a phone call, video call, other real-time media session, for instance.

At 204, method 200 may include sending one or more queries from the client device to a network device of the network, the one or more queries requesting information regarding the network device. In some examples, method 200 may include performing the sending the one or more queries from the client device to the network in response to establishing the network connection between the client device and the network device. Method 200 may include periodically repeating the sending the one or more queries from the client device to the network device. For instance, where the client device is a smart phone or other personal computing device, method 200 may include repeating the sending the one or more queries from the smart phone to the network in response to initiating a real-time media session from the client device.

At 206, method 200 may include, at least partly in response to sending the one or more queries, receiving, at the client device and from the network device, an address of the network device and at least one connectivity detail associated with the network device. The one or more queries may comprise at least one of a domain name system (DNS) query and a GET command. For instance, method 200 may include sending a DNS query from the client device to the network. In response to sending the DNS query, method 200 may include receiving an address of the network device at the client device and from the network device. Further, method 200 may include sending a GET command from the client device and to the network device in response to receiving the address of the network device. In response to sending the GET command, method 200 may include receiving, at the client device and from the network device, the at least one connectivity detail associated with the network device. The at least one connectivity detail may comprise an indication of whether the network device is connected to the client device via a wired connection or a wireless connection, for instance.

At 208, method 200 may include sending the address of the network device and the at least one connectivity detail associated with the network device from the client device to server device. For example, the server device may be accessed by an administrator of an application that is running on the client device. In some examples, the administrator may be operating or managing the application via one or more server devices. Method 200 may include sending the address of the network device and the at least one connectivity detail associated with the network device from the client device to the server device with registration information of the client device. The registration information may be related to the network connection, such as an identifier of the client device and/or the network device, a status of the registration of the client, etc.

FIG. 3 illustrates a flow diagram of an example method 300 for a server device to perform network metric discovery techniques. Method 300 may be performed by a server-side device (e.g., server device 108) communicatively coupled to a client device (e.g., client device 104) and/or a network device (e.g., network device 106) via a network (e.g., cloud computing network 102 and/or network connections 110), for instance. In some examples, method 300 may be performed by a computing device comprising one or more processors and one or more non-transitory computer-readable media storing computer-executable instructions that, when executed by the one or more processors, cause the one or more processors to perform method 300.

At 302, method 300 may include receiving, from a client device communicatively coupled to the system via a network connection with a network device, an address of the network device. Simply learning the address of at least one network device in the network may provide an administrator of an application running at the client device with a starting point to collect additional information about the network. For instance, based at least in part on the address of the network device, method 200 may include determining another client device communicatively coupled to the system via another network connection with the network device. Method 200 may also include determining other aspects of topology of the network, such as other network connections, network devices, client devices, etc. Method 200 may include sending one or more queries to devices associated with the network in an attempt to determine the other aspects of topology of the network, for example.

At 304, method 300 may include receiving, from the client device, connectivity details regarding the network connection between the client device and the network device. Method 200 may also include receiving, from the client device, an indication of a packet loss associated with the network connection. For example, the client device may report the packet loss as part of a reporting procedure of an application that the client device is running via the network.

At 306, method 300 may include, based at least in part on the connectivity details regarding the network connection, determining a potential cause of the packet loss. Based at least in part on the potential cause of the packet loss, method 200 may include checking for related issues in the system. For instance, method 200 may include checking for another packet loss experienced by another client device connected to the same network device and/or within the same network. Method 200 may include checking for the other packet loss experienced by the other client device by sending a query to the other client device, the query including a request for information regarding an application running on the other client device, a request for an update on network connectivity, and/or other requests for information that may help troubleshooting efforts.

At 308, method 300 may include generating a report of the packet loss, and/or of the potential cause of the packet loss. The report may be a presentation or compilation of one or more network metrics. Analytics may be performed on the network metric and provided in the report. For instance, a network issue may be correlated to a performance issue, and the result of the correlation may be provided in the report. The report may correlate poor quality for a real-time media session with an issue involving the network to which the client was connected. In other cases, the report may provide an administrator with a view of a contemporaneous network issue as a possible correlation with an application performance issue. The examples of reports presented herein are not meant to be limiting, a wide variety of report types and/or content are contemplated.

At 310, method 300 may include sending the report to a display device for presentation to a user. For example, a user that is acting as an administrator for an application running on the client device may view the report on a display device. The report may be presented as a GUI and/or a network administration portal, for instance. The administrator may interact with the presentation to troubleshoot, triage, or otherwise manage the application.

Figure 4:
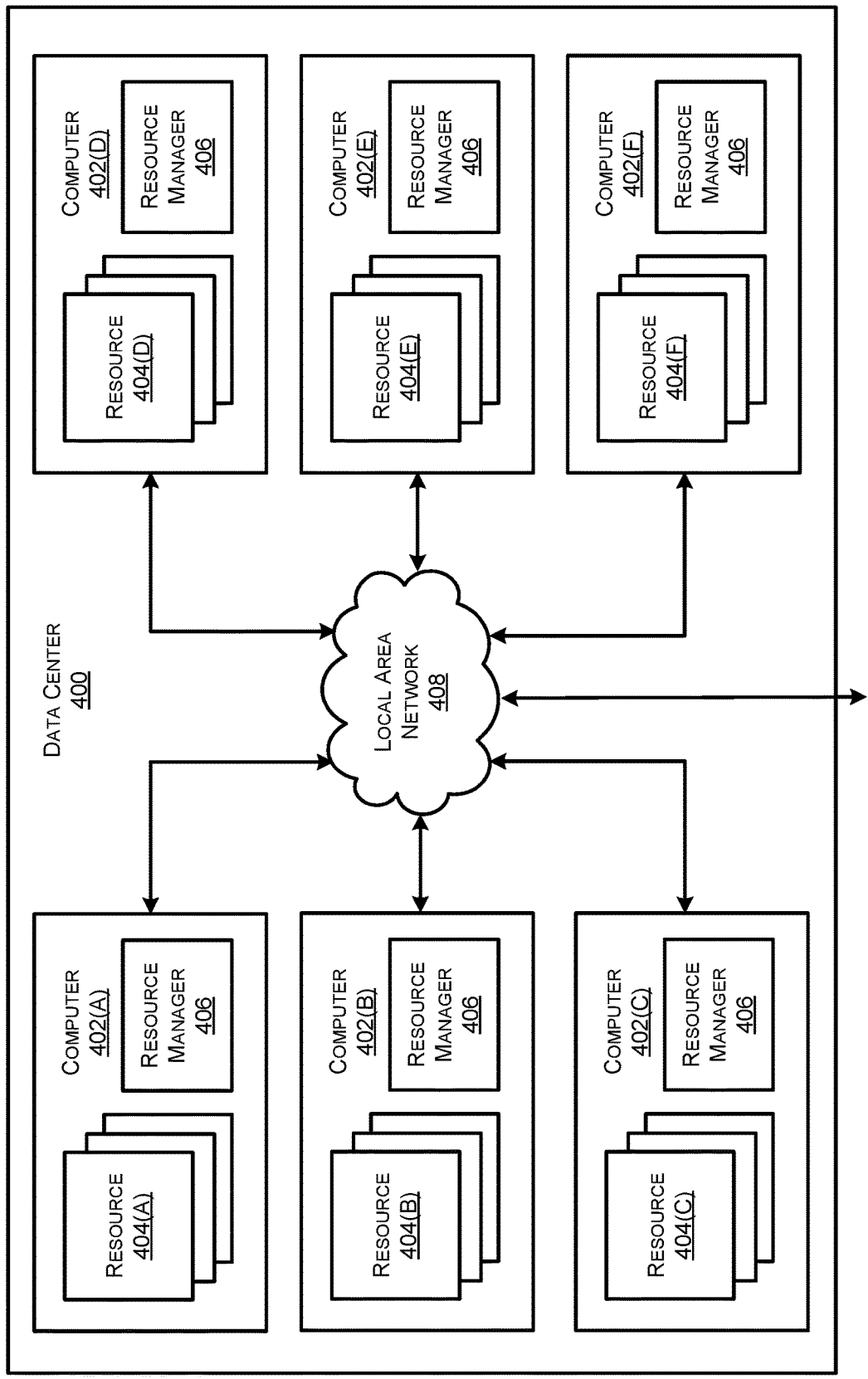
FIG. 4 illustrates a computing system diagram illustrating a configuration for a data center that can be utilized to implement aspects of the technologies disclosed herein.

FIG. 4 is a computing system diagram illustrating a configuration for a data center 600 that can be utilized to implement aspects of the technologies disclosed herein. The example data center 400 shown in FIG. 4 includes several computers 402A-402F (which might be referred to herein singularly as "a computer 402" or in the plural as "the computers 402") for providing computing resources. In some examples, the resources and/or computers 402 may include, or correspond to, any type of networked device described herein, such as a client device 104, network device 106, and/or server device 108. Although, computers 402 may comprise any type of networked device, such as servers, switches, routers, hubs, bridges, gateways, modems, repeaters, access points, hosts, etc.

The computers 402 can be standard tower, rack-mount, or blade server computers configured appropriately for providing computing resources. In some examples, the computers 402 may provide computing resources 404 including data processing resources such as virtual machine (VM) instances or hardware computing systems, database clusters, computing clusters, storage clusters, data storage resources, database resources, networking resources, and others. Some of the computers 402 can also be configured to execute a resource manager 406 capable of instantiating and/or managing the computing resources. In the case of VM instances, for example, the resource manager 406 can be a hypervisor or another type of program configured to enable the execution of multiple VM instances on a single computer 402. Computers 402 in the data center 400 can also be configured to provide network services and other types of services.

In the example data center 400 shown in FIG. 4, an appropriate local area network (LAN) 408 is also utilized to interconnect the computers 402A-402F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 400, between each of the computers 402A-402F in each data center 400, and, potentially, between computing resources in each of the computers 402. It should be appreciated that the configuration of the data center 400 described with reference to FIG. 4 is merely illustrative and that other implementations can be utilized.

In some examples, the computers 402 may each execute one or more application containers and/or virtual machines to perform techniques described herein. For instance, the containers and/or virtual machines may serve as server devices, user devices, and/or routers in the environment 100.

In some instances, the data center 400 may provide computing resources, like application containers, VM instances, and storage, on a permanent or an as-needed basis. Among other types of functionality, the computing resources provided by a cloud computing network may be utilized to implement the various services and techniques described above. The computing resources 404 provided by the cloud computing network can include various types of computing resources, such as data processing resources like application containers and VM instances, data storage resources, networking resources, data communication resources, network services, and the like.

Each type of computing resource 404 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 404 not mentioned specifically herein.

The computing resources 404 provided by a cloud computing network may be enabled in one embodiment by one or more data centers 400 (which might be referred to herein singularly as "a data center 400" or in the plural as "the data centers 400"). The data centers 400 are facilities utilized to house and operate computer systems and associated components. The data centers 400 typically include redundant and backup power, communications, cooling, and security systems. The data centers 400 can also be located in geographically disparate locations. One illustrative embodiment for a data center 400 that can be utilized to implement the technologies disclosed herein will be described below with regard to FIG. 5.

Figure 5:
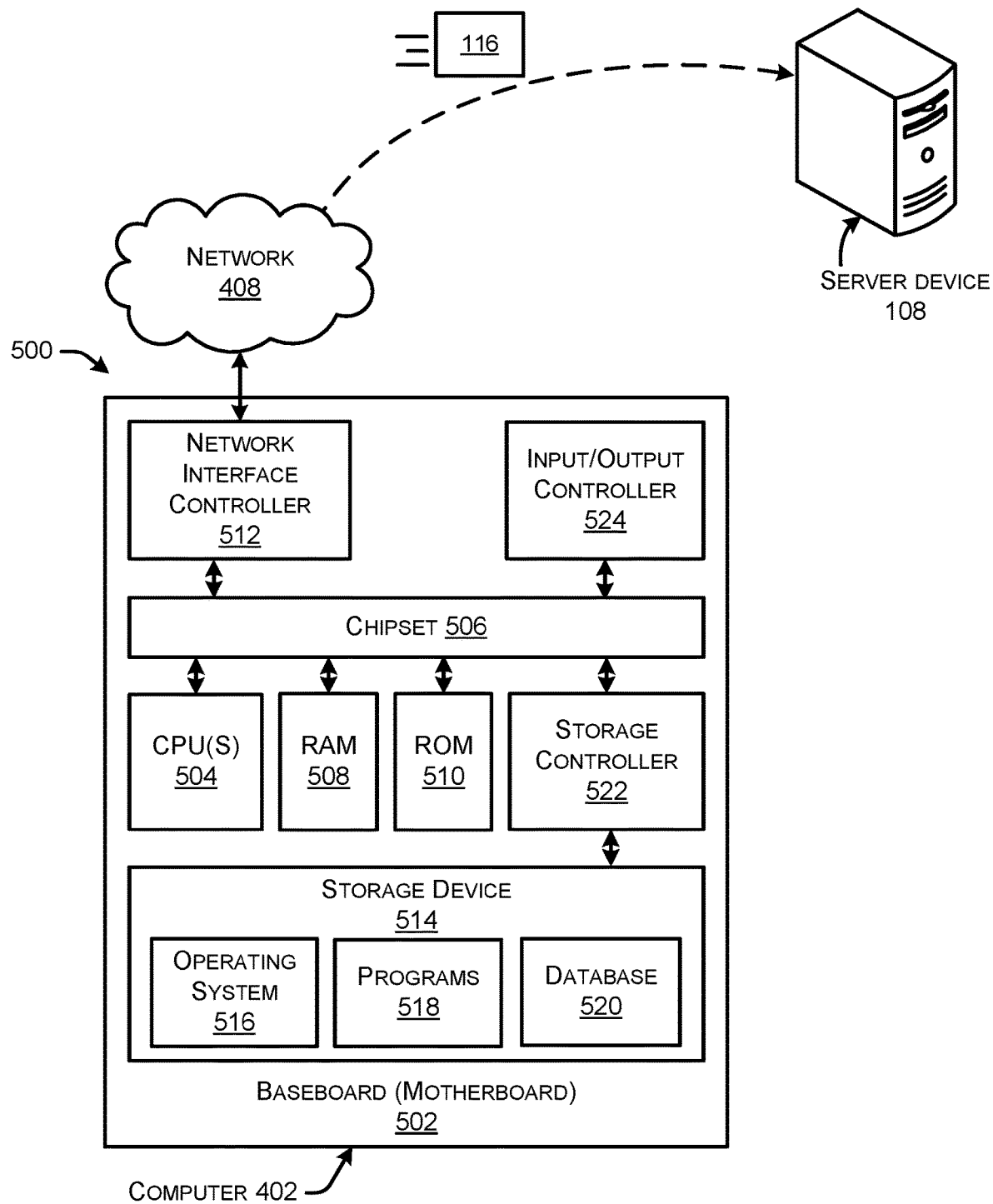
FIG. 5 is a computer architecture diagram showing an illustrative computer hardware architecture for implementing a device that can be utilized to implement aspects of the various technologies presented herein.

FIG. 5 shows an example computer architecture 500 for a computer 402 capable of executing program components for implementing the functionality described above. The computer architecture 500 shown in FIG. 5 illustrates a conventional server computer, workstation, desktop computer, laptop, tablet, network appliance, e-reader, smartphone, and/or other computing device, and can be utilized to execute any of the software components presented herein. The computer 402 may, in some examples, correspond to a physical device described herein (e.g., server device, user device, router, etc.), and may comprise networked devices such as servers, switches, routers, hubs, bridges, gateways, modems, repeaters, access points, etc. For instance, computer 402 may correspond to client device 104.

As shown in FIG. 5, the computer 402 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 402.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 402. The chipset 506 can further provide an interface to a computer-readable storage medium such as a read-only memory ("ROM") 510 or non-volatile RAM ("NVRAM") for storing basic routines that help to startup the computer 402 and to transfer information between the various components and devices. The ROM 510 or NVRAM can also store other software components necessary for the operation of the computer 402 in accordance with the configurations described herein.

The computer 402 can operate in a networked environment using logical connections to remote computing devices and computer systems through a network, such as the networks 102 and/or 408. The chipset 506 can include functionality for providing network connectivity through a network interface controller (NIC) 512, such as a gigabit Ethernet adapter. The NIC 512 is capable of connecting the computer 402 to other computing devices over the network 102. For instance, in the example shown in FIG. 5, NIC 512 may help facilitate transfer of data, packets, and/or communications, such as queries 112, replies 114, and/or metrics 116, over the network 102 with network devices 106 and/or server device 108. It should be appreciated that multiple NICs 512 can be present in the computer 402, connecting the computer to other types of networks and remote computer systems.

The computer 402 can be connected to a storage device 514 that provides non-volatile storage for the computer. The storage device 514 can store an operating system 516, programs 518, network metrics 520, and/or other data. The storage device 514 can be connected to the computer 402 through a storage controller 522 connected to the chipset 506, for example. The storage device 514 can consist of one or more physical storage units. The storage controller 522 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 402 can store data on the storage device 514 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 514 is characterized as primary or secondary storage, and the like.

For example, the computer 402 can store information to the storage device 514 by issuing instructions through the storage controller 522 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 402 can further read information from the storage device 514 by detecting the physical states or characteristics of one or more particular locations within the physical storage units.

In addition to the mass storage device 514 described above, the computer 402 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 402. In some examples, the operations performed by the network 102, and or any components included therein, may be supported by one or more devices similar to computer 402. Stated otherwise, some or all of the operations performed by the network 102, and or any components included therein, may be performed by one or more computer devices 402 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 514 can store an operating system 516 utilized to control the operation of the computer 402. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 514 can store other system or application programs and data utilized by the computer 402.

In one embodiment, the storage device 514 or other computer-readable storage media is encoded with computer-executable instructions which, when loaded into the computer 402, transform the computer from a general-purpose computing system into a special-purpose computer capable of implementing the embodiments described herein. These computer-executable instructions transform the computer 402 by specifying how the CPUs 504 transition between states, as described above. According to one embodiment, the computer 402 has access to computer-readable storage media storing computer-executable instructions which, when executed by the computer 402, perform the various processes described above with regards to FIGS. 1A-3. The computer 402 can also include computer-readable storage media having instructions stored thereupon for performing any of the other computer-implemented operations described herein.

The computer 402 can also include one or more input/output controllers 524 for receiving and processing input from a number of input devices, such as a keyboard, a mouse, a touchpad, a touch screen, an electronic stylus, or other type of input device. Similarly, an input/output controller 524 can provide output to a display, such as a computer monitor, a flat-panel display, a digital projector, a printer, or other type of output device. It will be appreciated that the computer 402 might not include all of the components shown in FIG. 5, can include other components that are not explicitly shown in FIG. 5, or might utilize an architecture completely different than that shown in FIG. 5.

As described herein, the computer 402 may comprise one or more devices, such as client devices 104, network devices 106, server device 108, and/or other devices. The computer 402 may include one or more hardware processors 504 (processors) configured to execute one or more stored instructions. The processor(s) 504 may comprise one or more cores. Further, the computer 402 may include one or more network interfaces configured to provide communications between the computer 402 and other devices, such as the communications described herein as being performed by client devices 104, network devices 106, and server device 108, and/or other devices. In some examples, the communications may include data, packet, request, query, reply, metric, and/or other information transfer, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 518 may comprise any type of programs or processes to perform the techniques described in this disclosure in accordance with network metric discovery techniques. For instance, the programs 518 may cause the computer 402 to perform techniques for communicating with other devices using any type of protocol or standard usable for determining connectivity. Additionally, the programs 518 may comprise instructions that cause the computer 402 to perform the specific techniques for the discovery of network metrics.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more non-transitory computer-readable media storing computer-executable instructions that, when executed by the one or more processors, cause the one or more processors to:
establish a network connection with a first client device, wherein traffic of the network connection is communicated between the first client device and the system via a network device;
receive, from the first client device, an address of the network device;
receive, from the first client device, at least one connectivity detail regarding a first portion of the network connection that extends between the first client device and the network device and an indication of a first packet loss associated with the first portion of the network connection;
based at least in part on the at least one connectivity detail regarding the first portion of the network connection, determine a potential cause of the first packet loss;
determine a second client device communicatively coupled to the system via a second network connection with the network device; and
based at least in part on the potential cause of the first packet loss, check for a second packet loss experienced by the second client device associated with the second network connection.

2. The system of claim 1, wherein the second client device is determined based at least in part on the address of the network device.

3. The system of claim 1, comprising further computer-executable instructions that, when executed, cause the one or more processors to:
check for the second packet loss experienced by the second client device by sending a query to the second client device, the query including a request for information regarding an application running on the second client device.

4. The system of claim 3, comprising further computer-executable instructions that, when executed, cause the one or more processors to:
receive, in response to the query, a report indicating a connectivity status of the second client device; and
correlate, based at least in part on the report from the second client device, the first packet loss to the first client device or to the network device.

5. The system of claim 1, wherein the address of the network device is a media access control (MAC) address.

6. The system of claim 1, comprising further computer-executable instructions that, when executed, cause the one or more processors to:
determine the potential cause of the first packet loss by correlating the at least one connectivity detail with the indication of the first packet loss.

7. A method comprising:
establishing, by a server device, a network connection with a first client device, wherein traffic of the network connection is communicated between the first client device and the server device via a network device;
receiving, from the first client device and at the server device, an address of the network device;
receiving, from the first client device and at the server device, connectivity details regarding a first portion of the network connection that extends between the first client device and the network device and an indication of a first packet loss associated with the first portion of the network connection;
based at least in part on the connectivity details regarding the first portion of the network connection, determining, by the server device, a potential cause of the first packet loss;
determining, by the server device, a second client device communicatively coupled to the network device via a second network connection; and
based at least in part on the potential cause of the first packet loss, checking, by the server device, for a second packet loss experienced by the second client device associated with the second network connection.

8. The method of claim 7, further comprising:
determining the second client device based at least in part on the address of the network device.

9. The method of claim 7, further comprising:
checking for the second packet loss experienced by the second client device by sending a query to the second client device, the query including a request for information regarding an application running on the second client device.

10. The method of claim 9, further comprising:
receiving, in response to the query, a report indicating a connectivity status of the second client device; and
correlating, based at least in part on the report from the second client device, the first packet loss to the first client device or to the network device.

11. The method of claim 7, wherein the address of the network device is a media access control (MAC) address.

12. The method of claim 7, further comprising:
determining the potential cause of the first packet loss by correlating the connectivity details with the indication of the first packet loss.

13. A method comprising:
establishing, by a server device, a network connection with a first client device, wherein traffic of the network connection is communicated between the first client device and the server device via a network device;
receiving, from the first client device and at the server device, an address of the network device;
receiving, from the first client device and at the server device, connectivity details regarding a first portion of the network connection that extends between the first client device and the network device and an indication of a first packet loss associated with the network device;
based at least in part on the connectivity details regarding the first portion of the network connection, determining a potential cause of the first packet loss associated with the network device;
determining a second client device communicatively coupled to the network device via a second network connection; and
based at least in part on the potential cause of the first packet loss, checking for a second packet loss experienced by the second client device.

14. The method of claim 13, wherein the connectivity details include an indication of whether the network device is connected to the first client device via a wired connection or a wireless connection.

15. The method of claim 13, wherein the connectivity details include registration information of the first client device, the registration information related to the network connection.

16. The method of claim 13, further comprising:
generating a report of the potential cause of the first packet loss; and
sending the report to a display device.

17. The method of claim 13, further comprising:
determining the potential cause of the first packet loss by correlating the connectivity details with the indication of the first packet loss.

18. The method of claim 13, further comprising:
checking for the second packet loss by sending a query to the second client device.

19. The method of claim 18, wherein the determining the potential cause of the first packet loss is based at least in part on receiving a response to the query sent to the second client device.

20. The method of claim 18, further comprising:
receiving a response to the query from the second client device; and
differentiating whether the potential cause of the first packet loss is associated with the first client device or associated with the network device based on the response to the query.

* * * * *